United States Patent
Schneider et al.

(10) Patent No.: US 7,984,912 B2
(45) Date of Patent: Jul. 26, 2011

(54) MULTI-LAYER METALLIC FLAT GASKET

(75) Inventors: Juergen Schneider, Merklingen (DE); Albrecht Sailer, Neu-Ulm (DE); Bernd Ruess, Voehringen (DE); Guenther Unseld, Neenstetten (DE); Georg Egloff, Weissenhorn (DE); Johann Waldvogel, Thannhausen (DE); Kurt Hoehe, Langenau (DE)

(73) Assignee: Dana Automotive Systems Group, LLC, Maumee, OH (US)

( * ) Notice: Subject to any disclaimer, the term of this patent is extended or adjusted under 35 U.S.C. 154(b) by 477 days.

(21) Appl. No.: 12/084,229

(22) PCT Filed: Jul. 27, 2007

(86) PCT No.: PCT/EP2007/057767
§ 371 (c)(1),
(2), (4) Date: Nov. 14, 2008

(87) PCT Pub. No.: WO2008/012363
PCT Pub. Date: Jan. 31, 2008

(65) Prior Publication Data
US 2009/0152819 A1 Jun. 18, 2009

(30) Foreign Application Priority Data
Jul. 27, 2006 (DE) .................... 10 2006 034 784

(51) Int. Cl.
*F02F 11/00* (2006.01)
(52) U.S. Cl. .................................................... 277/593
(58) Field of Classification Search ........... 277/593–595
See application file for complete search history.

(56) References Cited

U.S. PATENT DOCUMENTS

| 5,522,604 | A | 6/1996 | Weiss et al. | |
| 6,769,696 | B2 | 8/2004 | Diez et al. | |
| 6,796,696 | B2 * | 9/2004 | Taniuchi | 362/539 |
| 6,814,357 | B2 * | 11/2004 | Diez et al. | 277/593 |
| 7,000,924 | B2 | 2/2006 | Hohe et al. | |
| 2002/0084652 | A1 | 7/2002 | Halbrock et al. | |
| 2002/0153666 | A1 | 10/2002 | Unseld | |
| 2004/0041352 | A1 | 3/2004 | Hohe et al. | |
| 2005/0206091 | A1 * | 9/2005 | Detmann et al. | 277/594 |
| 2006/0097459 | A1 | 5/2006 | Hohe et al. | |
| 2007/0013145 | A1 * | 1/2007 | Detmann et al. | 277/593 |

FOREIGN PATENT DOCUMENTS

| DE | 2 145 482 | 6/1973 |
| DE | 42 19 709 A1 | 2/1994 |
| DE | 196 41 491 A1 | 4/1998 |
| DE | 197 08 970 A1 | 10/1998 |
| DE | 100 09 902 A1 | 9/2001 |

(Continued)

*Primary Examiner* — Vishal Patel
(74) *Attorney, Agent, or Firm* — Marshall & Melhorn LLC (57) ABSTRACT

A gasket has sealing layer(s) with beads which are assigned to passage opening(s), and stopper layer(s) with a stopper which limits the resilience of the bead(s). The stopper is composed of a plurality of directly successive ridge-shaped elevations and groove-shaped depressions, both being trapezoidal in cross section and both being formed in on both sides of the stopper layer, with setting angles of the trapezium flanks. The trapezoidal elevations of the one side are situated opposite the trapezoidal depressions of the other side. A cross section ($Q_1$) which is delimited by opposing trapezium flanks which are adjacent to one another is the same or greater than a cross section ($Q_2$) which is delimited between the opposing depressions of the two sides.

35 Claims, 8 Drawing Sheets

FOREIGN PATENT DOCUMENTS

| | | |
|---|---|---|
| DE | 102 17 526 A1 | 4/2003 |
| DE | 201 21 984 U1 | 1/2004 |
| DE | 102 56 896 A1 | 7/2004 |
| DE | 10 2004 033 906 A1 | 2/2006 |
| EP | 0 863 335 B1 | 9/1998 |
| EP | 1 209 406 A1 | 5/2002 |
| EP | 1 298 364 B1 | 4/2003 |
| EP | 1 577 589 A1 | 9/2005 |
| JP | 11-108191 A | 4/1999 |
| WO | WO 01/96768 A1 | 12/2001 |
| WO | WO 2006/005488 A1 | 1/2006 |

* cited by examiner

MULTI-LAYER METALLIC FLAT GASKET

FIELD OF THE INVENTION

The invention relates to a multi-layer metallic flat gasket, which can be in particular a cylinder head gasket, or else can be embodied and used as a sealing means for other faces to be sealed, for example for a wide variety of flange gaskets.

BACKGROUND OF THE INVENTION

Gaskets of said type can be of single-layer design. The subject matter of the present application is however a multi-layer gasket, as is known per se from the prior art.

A gasket of said type normally has a plurality of passage openings which extend through its layers, in particular one or more combustion gas openings, and further openings for fastening means, oil ducts, cooling water ducts and the like.

The gasket is composed of one or more sealing layers. In order to increase and ensure its sealing action, it is conventional to form a bead around the passage openings, in particular around the combustion gas openings, or else for example around the cooling water ducts, by means of corresponding deformation of at least one of the sealing layers, which bead generally completely encloses the passage opening or the passage openings.

In order to obtain the functionality of said beads, their excessive or complete plastic deformation as a result of compression during installation or during operation must be prevented. For this purpose, deformation limiters are conventionally used, which can also be referred to as stoppers. These are known in a wide variety of embodiments. They can for example be generated by bending the layers or one of the layers. It is however also conventional to form the one or more deformation delimiter(s) (stopper(s)) into the one or more sealing layer(s) in the form of embossings with a lower height than the bead height.

Finally, it is also already known to provide one of the layers of the multi-layer gasket as a spacer plate or stopper layer with the deformation limiter (stopper). The present invention relates to such a gasket type.

Here, the stopper can for example be arranged in the region between the bead and the combustion chamber, or else at the other side or at both sides of the bead.

Known are inter alia stoppers which extend as an annular band around a combustion chamber opening, which band is formed as a two-dimensional pattern of extruded cup-like depressions and elevations, with the elevations being formed by material of the sheet metal layer which is displaced during the embossing of the depressions, and each depression being situated directly opposite an elevation on the other side of the sheet metal layer, so that a diamond or chessboard pattern of elevations and depressions is generated on both sides of the sheet metal layer (EP 1577589 A1). Here, however, the elevations and depressions do not form a closed line.

In contrast, however, it has proven to be advantageous to design the stopper to be composed of a plurality of directly adjacent, directly adjoining ridge-shaped elevations and groove-shaped depressions which are formed in the spacer or stopper layer on its two sides, which elevations and depressions are assigned to the respective bead in order to limit its compression.

The successive elevations (ridges) and depressions (grooves) of the stopper can, in cross section, have the shape of a wave or of a toothing, in which the wave peaks and troughs or the tooth tips can also be flattened. It has also already been proposed to design the elevations and depressions to be rectangular in cross section, so as to generate rectangular webs (DE 196 41 491 A1) or profiled ribs (DE 2 145 482; JP 11-108191 A) and depressions which are correspondingly rectangular in cross section (so-called rectangular stoppers).

It has also already been proposed to form the elevations and depressions as ridges and grooves which are trapezoidal in cross section (DE 42 19 709 A1, DE 102 56 896 A1) or as waves which are trapezoidal in cross section (WO 01/96768 A1).

In each case, the amplitude of the elevations and depressions of the stopper is less than that of the beads which are to be protected.

WO 2006/005488 A1 criticizes the wave-shaped or sawtooth-shaped or also trapezoidal stoppers, which are mentioned above as being known, on account of their high elasticity and therefore reduced contact pressure. In the case of the rectangular stoppers, it is additionally objected to as being disadvantageous that their sharp-edged transitions between the elevations and depressions create the inherent risk of gasket parts breaking up.

In order to obtain the advantages of said known stoppers and at the same time to avoid their disadvantages, in particular to obtain their very rigid design and to nevertheless avoid damaging pressure peaks, it is proposed there to design the stopper such that, on the opposite sides of the spacer plate (of the stopper layer, referred to there as "other sealing layer"), depressions and elevations are alternately formed in such a way that a depression is situated at least partially opposite an elevation, that at least a part of the depressions and the elevations is substantially trapezoidal in cross section, with obliquely-running delimiting walls between the adjacently-arranged depressions and elevations of one side, and that the opposing delimiting walls, which are adjacent to one another, of two sides delimit a web cross section of the layer which is the same size as or greater than the cross section delimited between the opposing depressions of the two sides.

Although the teaching of making the cross section of the webs between adjacent, oblique delimiting walls of the trapezoidal elevations and depressions as thick as possible, specifically thicker than the cross section delimited between the depressions at both sides, leads to a considerable strengthening of the flanks of the trapezium and therefore to an increased stiffness of the stopper, and the trapezoidal design of the depressions simultaneously reduces the risk of breakage of parts of the stopper, albeit that this is the case only up to a certain degree, the stiffness which is gained is however not sufficient to give the stopper the fatigue strength which is actually required in use. This is attributed primarily to the fact that the stiffness of the stopper overall is adversely affected by the incisions of the depressions having to be relatively deep owing to the geometry of the stopper.

The geometric ratios of the cross sections in said stopper construction of the prior art also result in a very large amount of space being required for the stopper overall, both for the thickened portions and also for the embossings, in the case of which sufficient material must be displaced. Many gaskets do not offer the prerequisites necessary for this.

Proceeding from said prior art, it is the object of the invention to provide a multi-layer metallic flat gasket with a stopper which has the required high fatigue strength (stiffness and breaking resistance), and at the same time can be produced more simply and cost-effectively.

SUMMARY OF THE INVENTION

The gasket according to the invention is formed as a multi-layer metallic flat gasket having one or more passage opening(s), in particular combustion gas openings, openings for fastening means, and in the case of cylinder head gaskets, also openings for cooling liquid or the like.

Said gasket is composed of at least one sealing layer having at least one resilient bead which comprises at least one passage opening, and at least one stopper layer having at least one stopper which limits the compression of the respective bead and is arranged adjacent to the bead and which, in cross section, is composed of directly successive ridge-shaped elevations and groove-shaped depressions both being substantially trapezoidal in cross section and both being formed in on both sides of the stopper layer, wherein the volumes of the opposing elevations and depressions differ by less than 10%, preferably by less than 5%, particularly preferably by less than 2%.

The material on the one side of the stopper which is displaced out of the trapezoidal depressions of the one side during production of the stopper serves, and thus directly suffices, to form the in each case opposing elevation on the other side. Slight variations in the volumes, which do not exceed 10%, preferably 5% and particularly preferably 2%, can be generated if the flanks of the elevations and depressions are strengthened in order to give the stopper a particular stiffness.

A stopper of sufficient fatigue strength, in particular of sufficient stiffness and breaking resistance, which in any case provides better achievable values in this regard than those in the prior art according to WO 2006/005488 A1, is obtained according to the invention in that, at the same time—in contrast to that according to WO 2006/005488 A1—the cross section $Q1$, which is defined by two parallel lines which run through trapezium flanks which are situated opposite one another most closely, is small in relation to a cross section $Q2$ which is defined by two lines which connect the bases of the depressions of each side.

In addition to the embodiment with elevations and depressions having trapezium flanks which run exclusively parallel to one another, the invention also encompasses embodiments in which not all of the trapezium flanks run parallel to one another. In this case, the cross section $Q1$ is formed between the straight lines which have the mean value of the gradients of the two trapezium flanks and intersect the respective trapezium flanks at their half height (in the event of symmetrical constructions at $Q5/4$).

The subject matter of WO 2006/005488 A1 is characterized in that the ratio of $Q1$ to $Q2$ is of inverse design; the cross section between in each case two trapezium flanks which are situated parallel to one another most closely is therefore thicker than the cross section of the region situated between the bases of the depressions, at both sides, of the stopper. In the subject matter according to WO 2006/005488 A1, the trapezium flanks or the regions defined by these therefore support the load which the stopper must absorb. Here, it is however left unconsidered that the weakening, which is associated with said geometry, of the region between the bases at both sides, that is to say of the core region of the stopper layer which remains after the embossing, at the same time the base for the load-bearing elevations, inherently creates deformation potential which gives the stopper overall an undesired elasticity.

In contrast, the teaching according to the patent relates to designing the base for the load-bearing elevations, that is to say the core region $Q2$ of the stopper layer which remains after the embossing, to be sufficiently stable that it can permanently withstand the deformation forces in operation.

In this context, those embodiments are preferred in which identical or substantially identical volumes of opposing elevations and depressions are obtained by means of embossings of different width, specifically wider and shallower depressions which are situated opposite narrower and deeper elevations. Here, the remaining core region is on average particularly wide and therefore particularly stable. Here, it is not necessary for the elevations and depressions which are present on one side to all have the same width.

As a result of a smaller degree of plastic deformation being required for the production of the embodiment with geometrically identically designed opposing elevations and depressions, and the material flow being simplified on account of the geometric conditions, this embodiment is proven to be particularly advantageous, since it can be produced with relatively low pressing forces. In the extreme case, all the elevations and depressions, possibly with the exception of the in each case first and last on one side—have the same geometries.

As already mentioned, the cross section $Q1$, which is defined by two parallel lines which run through trapezium flanks which are situated opposite one another most closely, can be very small, in particular in relation to $Q2$, since a wide cross section $Q2$ supports the entire stopper construction. $Q1$ may not, however, be so small that the trapezium shape of the elevations and depressions is practically lost, because the setting angle of the trapezium flanks then approaches 90°. Although this scarcely adversely affects the durability of the stopper, it can however bring difficulties during the embossing, which the trapezium shape specifically avoids. Shallower angles are advantageous during the demoulding process in the tool.

The setting angles of the trapezium flanks will therefore lie between 30° and 89°, preferably between 60° and 89°, and are in particular substantially 70°. Here, as already mentioned, it is not necessary for all the elevations and depressions to have identical trapezium flank angles. Here, the angles should differ from one another by no more than 35°, preferably by no more than 15°, particularly preferably by no more than 8°.

The width of the plateaus of the trapezoidal elevations and the width of the bases of the trapezoidal depressions is preferably between 30% and 200%, but preferably between 40% and 150%, and more preferably between 40% and 100% and in particular between 40% and 70% of the thickness $Q3$ of the stopper layer in its unembossed region. Said values apply both for the embodiments with the identical width of the plateaus and bases and also for the embodiments with different-width plateaus and bases or different flank angles. In the latter embodiment, in particular when the widths differ to a high degree, a part of the widths can also be up to 300% of the thickness $Q3$.

Here, the cross section $Q1$ should for example be less than 50%, in particular less than 40%, of the cross section $Q3$ of the stopper layer in its unembossed region.

In order that the stopper can fulfil its purpose of effectively limiting the deformation of the bead, it is often sufficient for its effective height $Q5$ ($Q5=Q4-Q3$), that is to say the measure by which the stopper is thicker than the stopper layer in its region $Q3$ without the embossment, to be between 0.05 mm and 0.33 mm, preferably between 0.05 and 0.25 mm.

Figure 1A:
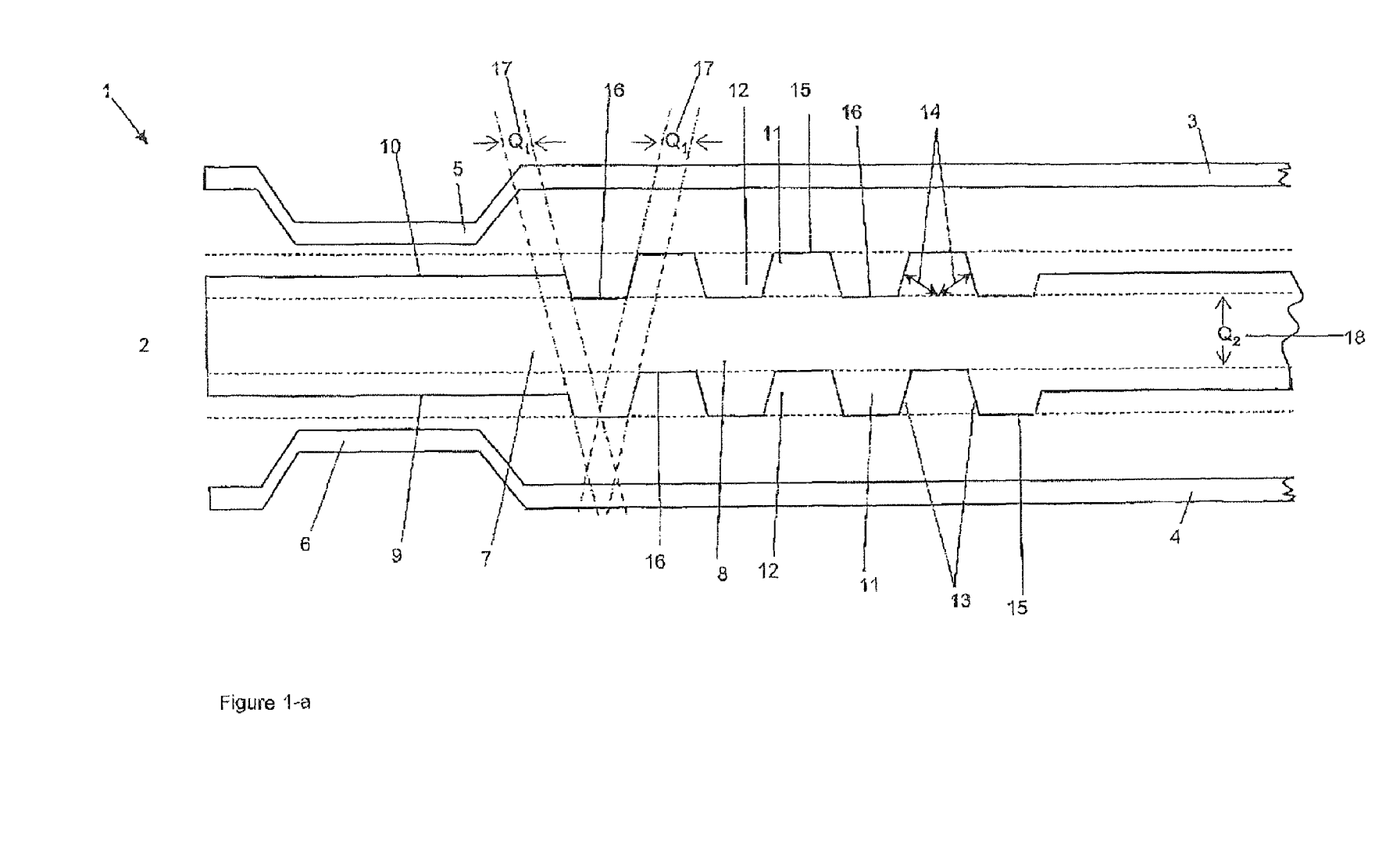
Figure 1B:
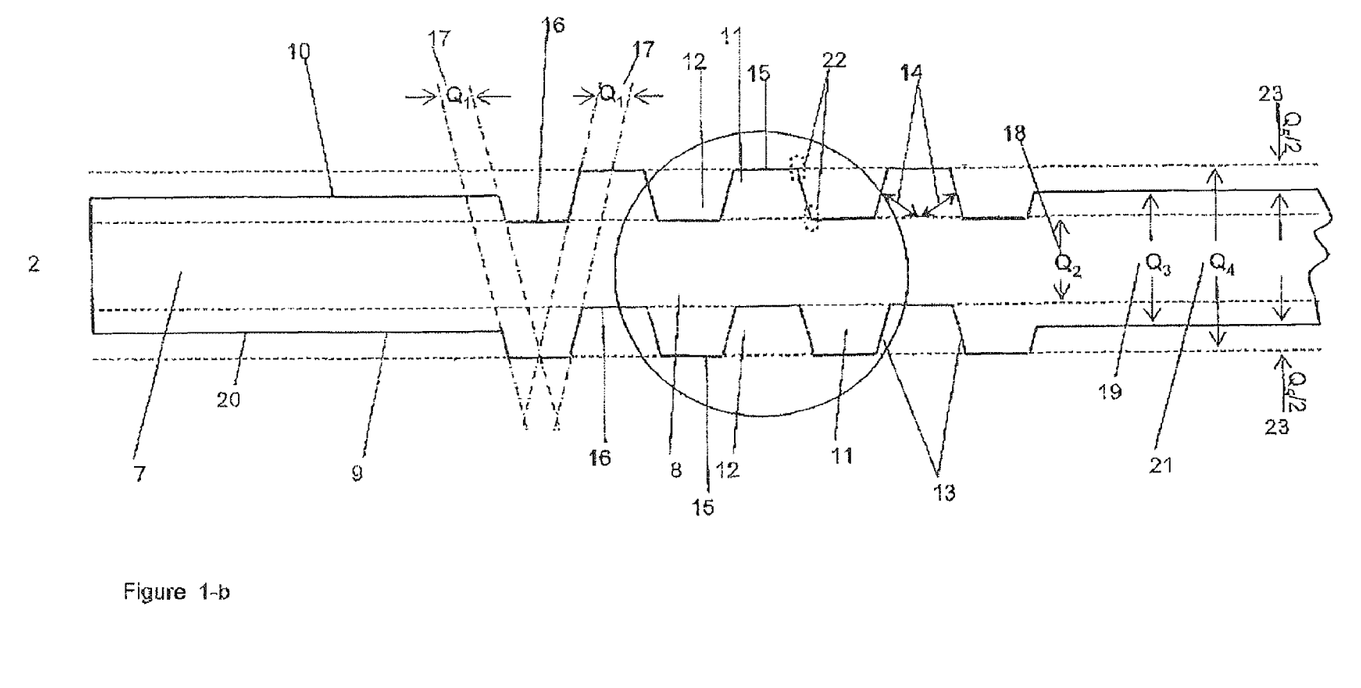
Figure 1C:
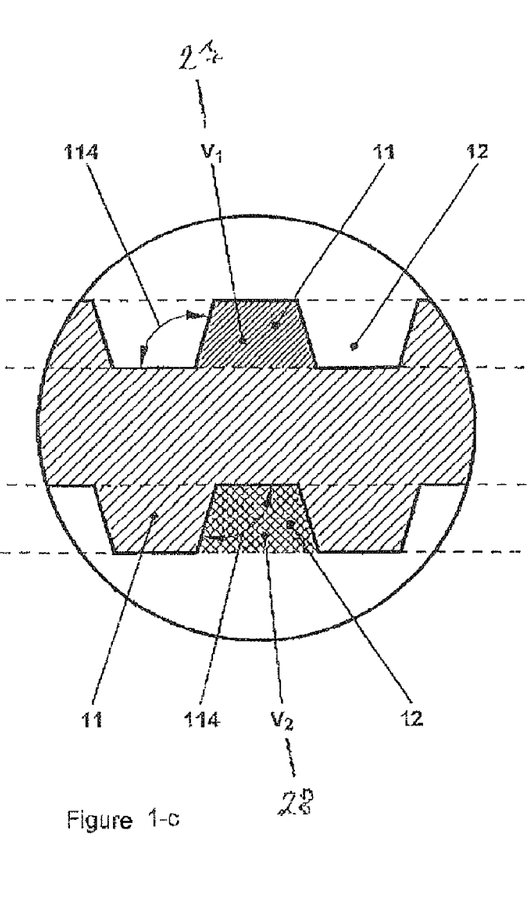
Figure 1D:
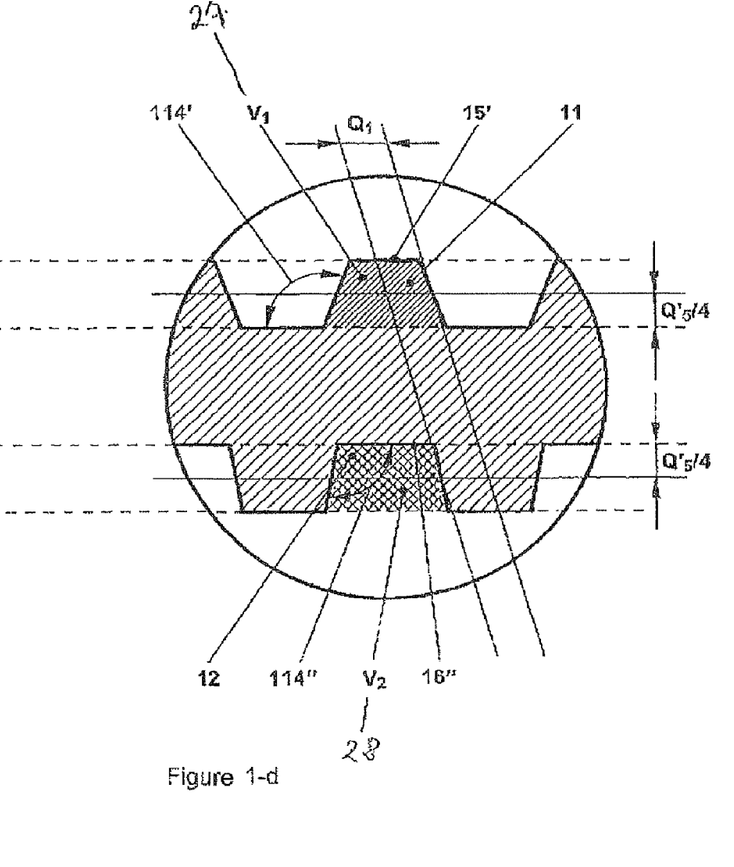
Figure 2:
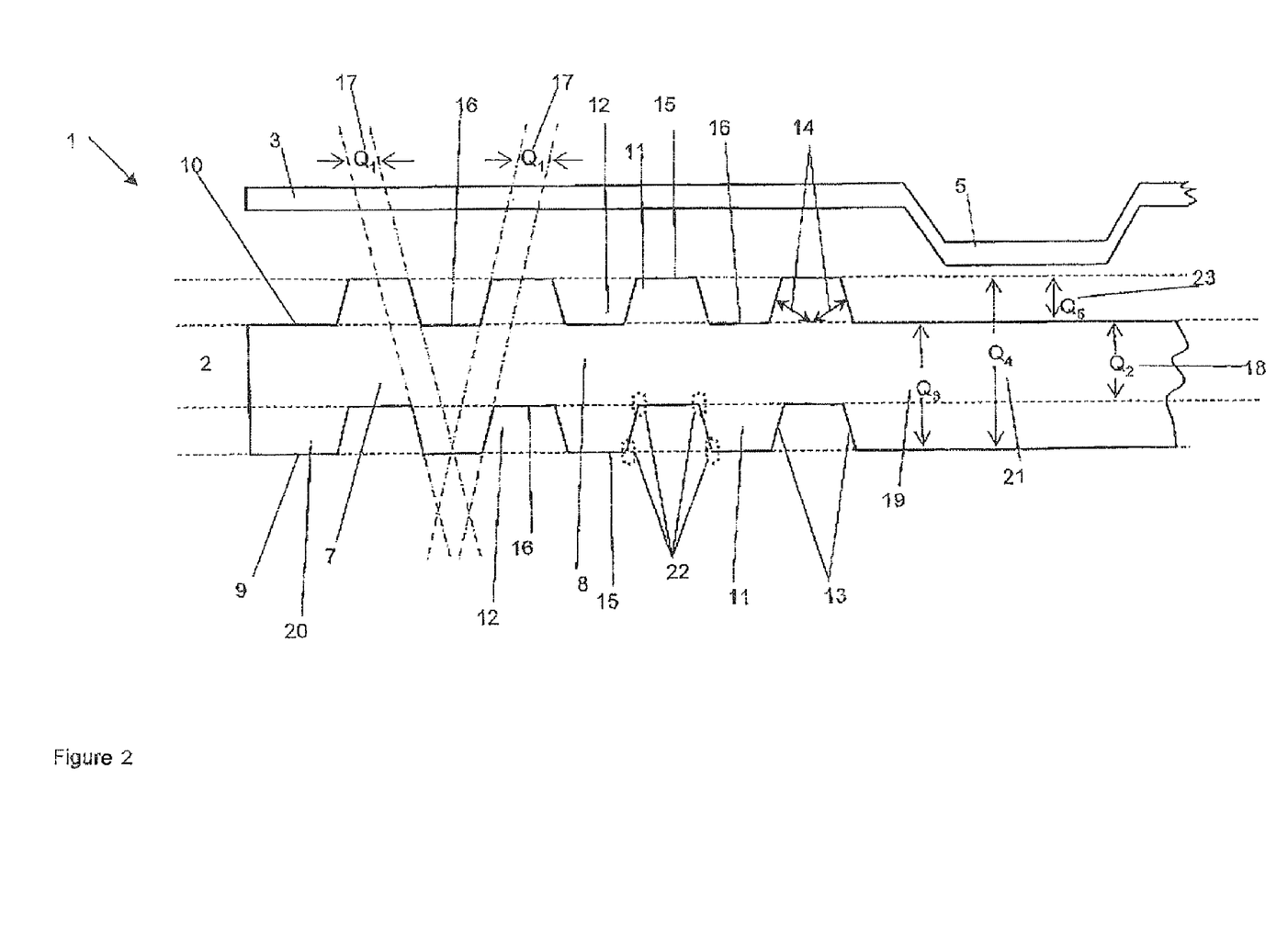
FIG. 2 shows a cross section through a flat gasket according to the invention, having one sealing layer and one stopper layer, in the beaded region.

Here, the effective height—as shown in FIG. 1—can be arranged so as to be distributed uniformly on both sides of the stopper layer. It can also—as shown in FIG. 2—be arranged on only one side of the stopper layer. In addition, further asymmetrical distributions between both sides are possible.

The overall width of the stopper is up to 7 mm, preferably 2-3 mm; here, the stopper, for reasons of space or for reasons of topographical design, which is explained in the further course of this description, can narrow or widen in sections, or even have interruptions in short sections.

In order to obtain a sufficiently durable stopper action, it is advantageous if the stopper layer has a relatively large number of adjacently-arranged pairs of elevations and depressions situated opposite to each other, wherein it is of course the case in adjacent pairs that the one pair has an elevation on that side on which the adjacent pair has a depression. On the other hand, spatial conditions lead to a limitation of the number of adjacent pairs of elevations and depressions. For this reason, the stopper according to the invention has at least three, preferably at least four, particularly preferably at least five pairs of elevations and depressions situated opposite one another. Here, it is sufficient for said number of elevation/depression pairs to be present on at least 60%, preferably on at least 70% and particularly preferably on 75% of the length of the stopper contour—with regard to closed-ring, ring-like or spectacle-like shapes.

The stopper layer (7) can be produced from a steel with a tensile strength of greater than 250 N/mm$^2$, preferably greater than 400 N/mm$^2$, more preferably greater than 600 N/mm$^2$, and less than 1400 N/mm$^2$, preferably less than 1300 N/mm$^2$, more preferably less than 1200 N/mm$^2$. The tensile strength can therefore for example be less than 600 N/mm$^2$ or else less than 400 N/mm$^2$ or above 1200 N/mm$^2$ or even above 1400 N/mm$^2$.

Here, the chrome content of the material of the stopper layer is preferably less than 1%, particularly preferably less than 0.5%.

Said ranges offer the strength required for the stopper action and at the same time permit, at moderate pressing forces, the plastic deformation necessary for the stopper formation. The stopper layer is preferably produced from a steel of lower tensile strength than the at least one sealing layer.

In order to further minimize the risk of stopper breakages, the transitions between the bases of the trapezoidal depressions and the trapezium flanks and/or between the trapezium flanks and the plateaus of the trapezoidal elevations can be rounded. A radius of 0.04 mm to 0.1 mm but preferably a radius of 0.05 mm to 0.08 mm lends itself to use for said roundings.

If the stopper is assigned to a passage opening, it will often annularly surround said passage opening. Here, said stopper can be arranged between the passage opening and the assigned bead which likewise often annularly surrounds the passage opening, or else can also surround the bead or be arranged at both sides of the bead.

Figure 4:
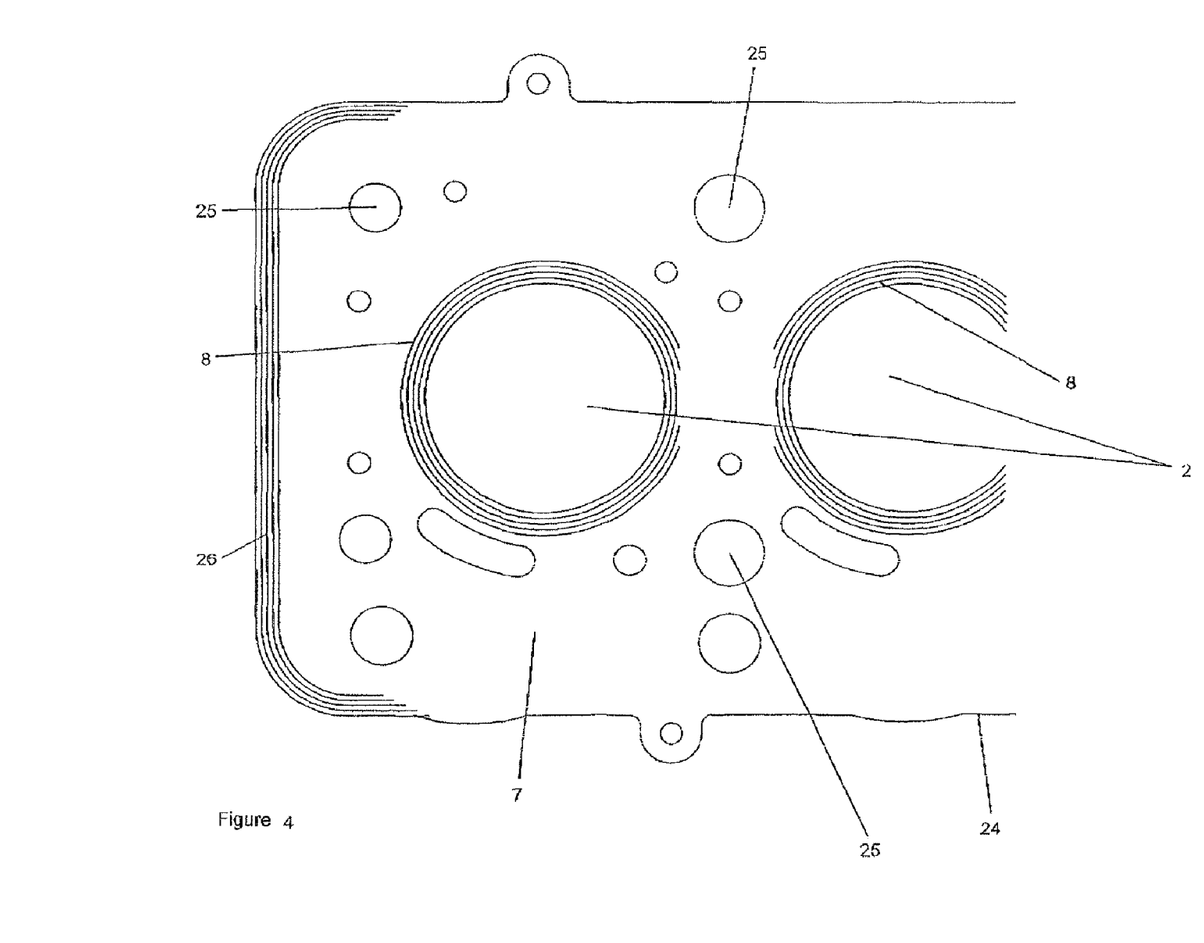

Instead of the annular shape, it is also possible to provide a shape which deviates from this, for example on account of the recesses for valves. Said shape can also be a spectacle shape, for example as a result of the beads and stoppers converging in the region between a plurality of passage openings, as is shown in FIG. 4. For reasons of space, short segment-shaped interruptions of the stopper are also possible.

In addition to stoppers assigned to the passage openings, further stoppers can run in regions remote from these, in the so-called hinterland of the stopper layer.

A further stopper of said type can for example be arranged in the region of the outer periphery of the flat gasket and/or at least partially in the region outside a region spanned by passage openings for fastening means.

In order to obtain uniform sealing face pressure, the stoppers can be of such a topographical design that their height and/or width and/or hardness increases with distance from the passage openings for fastening means. Here, the engine-specific conditions, in particular the zones of greater stiffness of the adjacent components, in particular of the cylinder head and engine block or exhaust manifold, are incorporated.

The increasing hardness of the stoppers can be generated by means of an increasing hardening of the material, the arrangement of an increasing number of trapezoidal elevations and depressions, by means of an increasing setting angle of the trapezium flanks or by means of a higher degree of embossing of the elevations.

BRIEF DESCRIPTION OF THE DRAWINGS

The gasket according to the invention is explained in more detail below on the basis of exemplary embodiments according to the drawings. Here, in each case schematically:

FIG. 1-a shows a cross section through a flat gasket according to the invention, having two sealing layers and one stopper layer, in the beaded region;

FIG. 1-b shows a cross section through the stopper layer according to the invention according to FIG. 1-a in the region of the stopper;

FIG. 1-c shows a detail from the cross section according to FIG. 1-b;

FIG. 1-d shows a variant of a detail according to FIG. 1-c;

For clarity, all of the cross sections have been shown in exploded illustrations, that is to say with spacings.

DETAILED DESCRIPTION OF THE INVENTION

FIG. 1-a shows a cross section through a multi-layer flat gasket 1 according to the invention having two sealing layers 3, 4 and one stopper layer 7 having a stopper 8 in the region of the passage or combustion gas passage opening 2. The sealing layers 3, 4 have in each case one bead 5, 6 for sealing off the combustion gas passage. In FIG. 1, said beads directly surround the passage or combustion gas passage opening 2.

The stopper 8 is formed from ridge-shaped elevations 11 and groove-shaped depressions 12 which are formed on both sides 9, 10 of the stopper layer 7 and are arranged directly adjacent to the beads. The elevations 11 and depressions 12 are trapezoidal in cross section, and the trapeziums in each case of one side 9 or 10 of the stopper layer are arranged in direct succession to one another such that adjacent trapeziums have in each case one common flank.

In the exemplary embodiment according to FIG. 1-a, the trapezium flanks all have substantially the same setting angles 14. At the same time, the plateaus 15 of the trapezoidal elevations 11 and the bases 16 of the trapezoidal depressions 12 have a substantially identical width, and each trapezoidal elevation 11 of the one side (9 or 10) of the stopper layer 7 is situated opposite a trapezoidal depression 12 of the other side (10 or 9).

Each pair of opposing trapezium flanks 13 which are closest to one another are aligned parallel or substantially parallel to one another since their setting angles 14 are substantially identical. The cross section 17 (Q1) formed between said trapezium flanks 13 or between two lines which run through the latter is small in relation to the cross section 18 (Q2) which is defined by the two lines which connect the bases 16 of each side of the stopper 8.

FIG. 1-b shows an enlarged section through the stopper layer according to the invention according to FIG. 1, in the region of a stopper. Said figure shows all of the features discussed above with regard to FIG. 1-a.

In addition, FIG. 1-b shows that the stopper layer 7 has an initial thickness 19 (Q3) in its unembossed region 20. The widths of the substantially equally-wide plateaus 15 of the trapezoidal elevations 11 and bases 16 of the trapezoidal depressions 12 can be in a certain ratio to the thickness. The width of the plateaus 15 of the trapezoidal elevations (11) and the width of the bases (16) of the trapezoidal depressions (12) is between 30% and 200%, preferably between 40% and 150% and particularly preferably between 40% and 100% of the thickness Q3. The cross section 17 (Q1) can likewise be placed in a certain ratio to the cross section 19 (Q3). The cross section Q1 (17) may be less than 50% and preferably less than 40% of the cross section Q3 (19).

FIG. 1-b also additionally shows an embodiment of the effective height 23 (Q5) which is divided herewith to value of 2×Q5/2 distributed uniformly on both sides of the stopper layer.

Finally, FIG. 1-b also shows an embodiment of the transitions 22 from the bases 16 of the trapezoidal depressions 12 to the trapezium flanks 13 and/or from the trapezium flanks 13 to the plateaus 15 of the trapezoidal elevations 11, which transitions 22 can be rounded with a radius of 0.04 mm to 0.1 mm, in particular with a radius of 0.05 mm to 0.08 mm, in order to thereby further reduce the risk of a stopper breakage.

FIG. 1-c shows a detail from the cross section of the stopper layer in an embodiment in which the same volumes of the considered elevation 11 (V1) and of the depression 12 (V2) can be obtained by means of identical geometries of the elevation 11 and of the depression 12. In particular, the flank angles—illustrated here by means of their opposite angles 114 for clarity—are also identical.

It is however in principle also possible to design the flank angles to be different, that is to say on the one hand to use different flank angles for opposing elevations 11 and depressions 12 and/or on the other hand to produce different flank angles for the elevations 11 and depressions 12 arranged on one surface 9 or 10 of the stopper layer. The—at least approximate—volume equality for V1 and V2 of a pair of opposing elevations and depressions is ensured here by adapting the base and plateau widths. FIG. 1-d schematically demonstrates an arrangement with different flank angles in a depression and its opposing elevation, in the case of which, by means of the selection of a wider base 16" and of a shallower flank angle, illustrated by means of a steeper opposite angle 114", for the depression 12, at least approximate volume equality with the elevation 11 is obtained, which itself has a relatively narrow plateau 15' and a relatively steep flank angle, illustrated by means of a shallower opposite angle 114'. Here, it should be explicitly highlighted that the elevations and depressions opposing each other have been embossed with the same height in the context of production accuracy.

The construction of the cross section Q1 can likewise be seen from FIG. 1-d. The slope of the two straight lines between which the cross section Q1 extends is given by the mean value of the slopes of the flanks of the plateaus which are arranged in succession on the upper and lower side. Said straight lines in turn intersect the flanks of the plateaus at their half height, that is to say at Q5'/4, where Q5=Q5'/2+Q5'/2.

FIG. 1-d illustrates an exemplary embodiment for an elevation 11 and the depression 12 which is situated opposite the latter, but without intending to make general specifications for the design of the respectively adjacent elevations and depressions. In the case of these, however, in each case one flank angle is given automatically by the adjacent structure. The latter also has an influence on the respective widths.

FIG. 2 shows a cross section through a multi-layer flat gasket 1 according to the invention having only one sealing layer 3 and one stopper layer 7 having a stopper 8 in the region of the passage or combustion gas passage opening 2. The sealing layer 3 has a bead 5 for sealing off the combustion gas passage. In the embodiment shown in FIG. 2, the stopper 8 is arranged between the bead 5 and the combustion gas passage opening 2. Said arrangement of the bead, stopper and combustion gas opening is in principle preferred over the arrangement shown in FIG. 1.

In order to obtain an optimum stopper action, the stopper 8 in the exemplary embodiment as per FIG. 2 is embossed asymmetrically, so that the effective height 23 (Q5) of the stopper 8 is arranged entirely on that side of the stopper layer 7 which faces the sealing layer 3.

Figure 3:
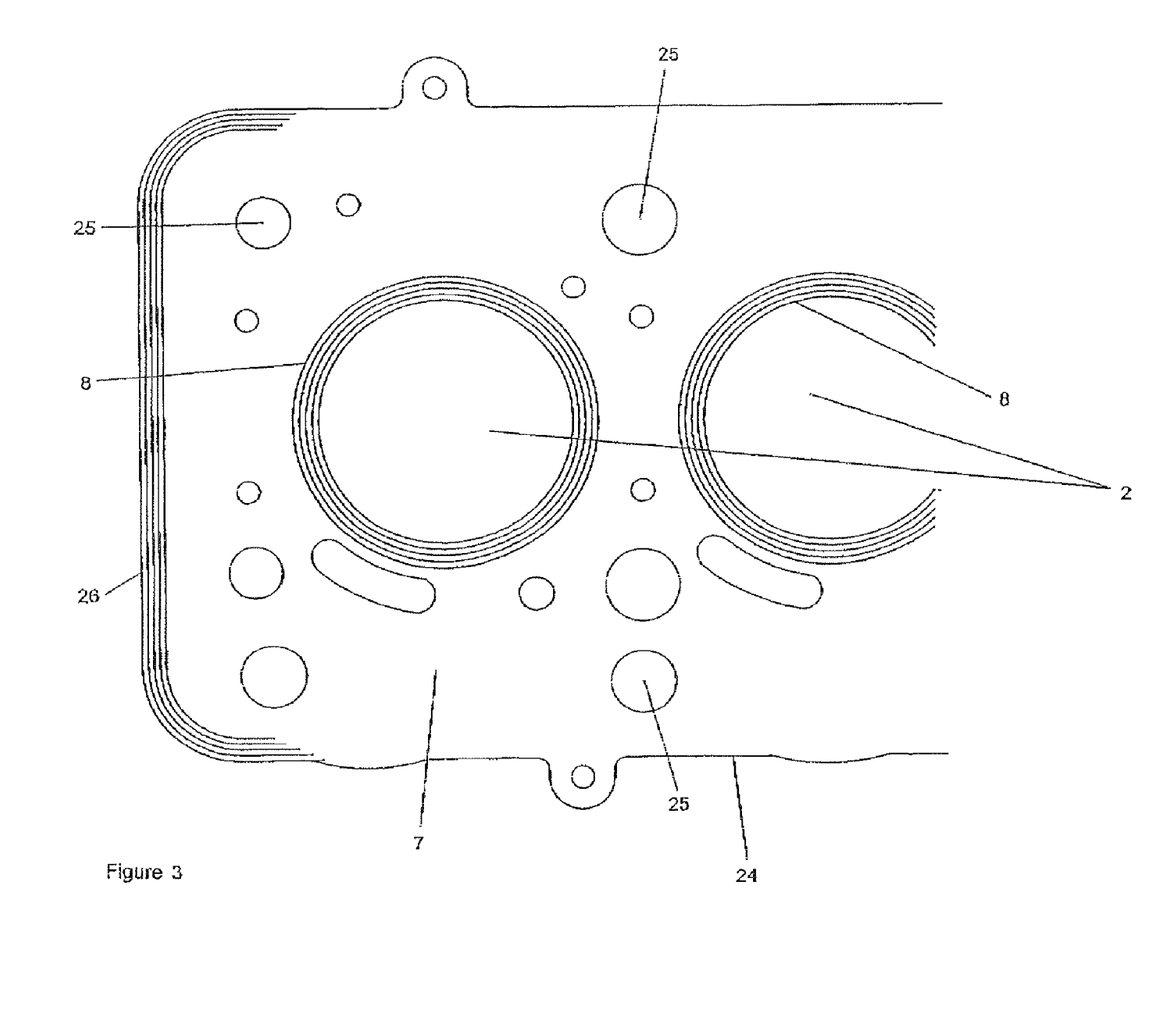
FIGS. 3 to 5 show plan views of different stopper layers according to the invention, in each case in a diagrammatic illustration which is not to scale.
Figure 5:
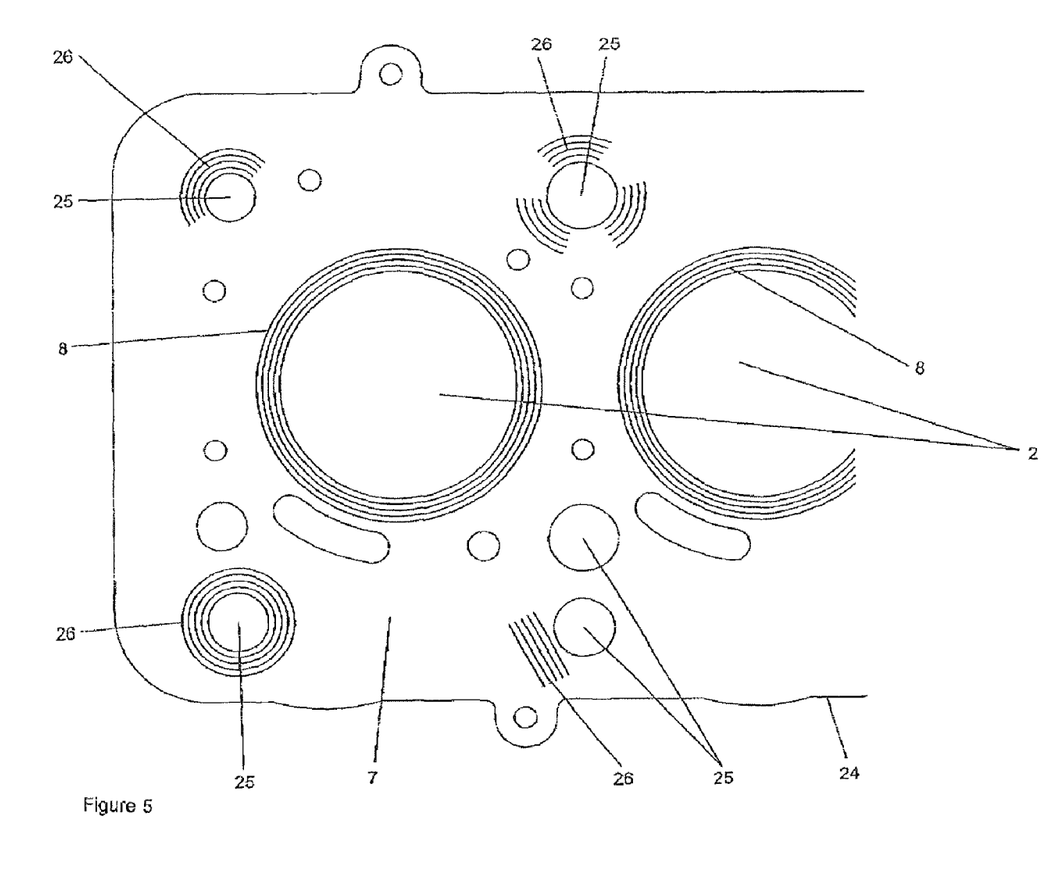

FIGS. 3 to 5 show in each case a plan view of a part of a stopper layer 7 in an in each case different configuration according to the invention. Said figures show the outer periphery 24 of the stopper layer 7, combustion gas passage openings 2, passage opening 25 for fastening means, stoppers 8 and further stoppers 26.

Here, FIG. 3 shows two stoppers 8 which annularly surround the combustion gas openings 2 and a further stopper 26 which is arranged at the outer periphery 24.

FIG. 4 differs from FIG. 3 in that the two stoppers 8 have a reduced number of elevations and depressions in the region in which the combustion gas passage openings adjoin one another, in the so-called web region. In the case of a significantly reduced spacing between the two stoppers 8, as occurs when the stopper is arranged on that side of the bead which faces away from the combustion chamber, adjacent stoppers can converge to form a so-called spectacle-shaped stopper.

FIG. 5 differs from FIG. 3 in that, instead of the further stopper 26 arranged at the outer periphery 24, a plurality of further stoppers 26—illustrated here in various embodiments—are arranged in the region of passage openings 25 for fastening means or in the region outside a region spanned by passage openings 25 for fastening means.

Figure 6:
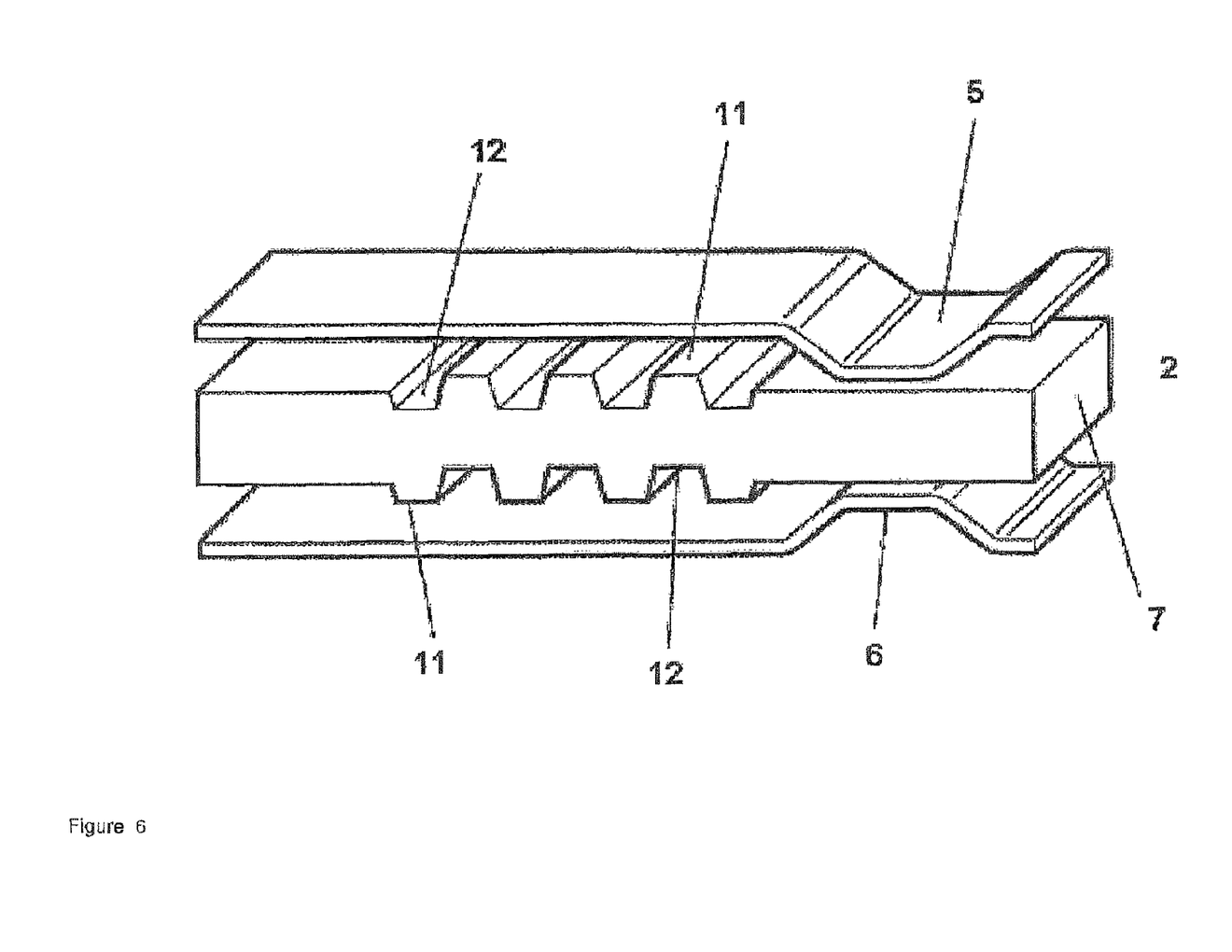
FIG. 6 shows a partially perspective cross section of a flat gasket according to the invention having two sealing layers and one stopper layer.

FIG. 6 finally shows that the elevations 11 and depressions 12 in the stopper layer 7 are guided approximately parallel to the beads 5 and 6, and therefore do not vary in their basic structure in their longitudinal direction.

LIST OF REFERENCE SYMBOLS

1 Multi-layer metallic flat gasket
2 Passage opening/combustion chamber opening
3 Sealing layer
4 Sealing layer
5 Bead
6 Bead
7 Stopper layer
8 Stopper
9 Side of the stopper layer
10 Side of the stopper layer
11 Ridge-shaped elevation which is substantially trapezoidal in cross section
12 Groove-shaped depression which is substantially trapezoidal in cross section
13 Trapezium flanks
14 Setting angle of the trapezium flanks
15 Plateau of the trapezoidal elevation 16 Base of the trapezoidal elevation
17 Cross section Q1
18 Cross section Q2
19 Thickness Q3 of the stopper layer
20 Non-embossed region of the stopper layer
21 Stopper height Q4
22 Transition
23 Effective height Q5 of the stopper
24 Outer periphery of the flat gasket
25 Passage opening for fastening means
26 Further stopper
27 Volume V1
28 Volume V2
114 Opposite angle to 14

The invention claimed is:

1. A multi-layer metallic flat gasket, comprising: at least one passage opening, at least one sealing layer with at least one resilient bead which surrounds the passage opening, and at least one stopper layer with at least one stopper which delimits the deformation of the bead and which is composed of a plurality of directly successive ridge-shaped elevations and groove-shaped depressions, both being substantially trapezoidal in cross section and both being formed in on both sides of the stopper layer, in each case with setting angles of the trapezium flanks, with the trapezoidal elevations of the one side being situated opposite the trapezoidal depressions of the other side, wherein the volumes V1, V2 of a trapezoidal elevation of the one side and of the opposite trapezoidal depression of the other side differ by less than 10%, and in that a cross section Q1, which is defined by two parallel lines which run through trapezium flanks which are situated opposite one another most closely, is small in relation to a cross section Q2 which is defined by two lines which connect the bases of the depressions of each side.

2. The flat gasket according to claim 1, wherein the stopper layer is produced from a steel with a tensile strength of greater than 250 N/mm² and less than 1400 N/mm².

3. The flat gasket according to claim 1, wherein the stopper layer is produced from a steel with a tensile strength of greater than 400 N/mm² and less than 1300 N/mm².

4. The flat gasket according to claim 1, wherein the stopper layer is produced from a steel with a tensile strength of greater than 600 N/mm² and less than 1200 N/mm².

5. The flat gasket according to claim 4, wherein the stopper layer has at least three directly successive pairs of elevation formed on one side and depression formed on the opposite side on at least 60% of the length of the stopper contour.

6. The flat gasket according to claim 5, wherein the stopper layer has at least four directly successive pairs of elevation formed on one side and depression formed on the opposite side on at least 60% of the length of the stopper contour.

7. The flat gasket according to claim 6, wherein the stopper layer has at least five directly successive pairs of elevation formed on one side and depression formed on the opposite side on at least 60% of the length of the stopper contour.

8. The flat gasket according to claim 7, wherein the volumes V1, V2 differ by less than 5%.

9. The flat gasket according to claim 8, wherein the volumes V1, V2 differ by less than 2%.

10. The flat gasket according to claim 9, wherein the setting angles of the trapezium flanks are between 30° and 89°.

11. The flat gasket according to claim 10, wherein the setting angles of the trapezium flanks are between 60° and 89°.

12. The flat gasket according to claim 11, wherein the setting angles of the trapezium flanks are substantially 70°.

13. The flat gasket according to claim 12, wherein the setting angles of the trapezium flanks within the stopper layer deviate from one another by up to 35°.

14. The flat gasket according to claim 13, wherein the setting angles of the trapezium flanks within the stopper layer deviate from one another by up to 15°.

15. The flat gasket according to claim 14, wherein the setting angles of the trapezium flanks within the stopper layer deviate from one another by up to 8°.

16. The flat gasket according to claim 15, wherein directly successive substantially trapezoidal elevations and depressions which are formed in the stopper layer have the same or substantially the same setting angles of the trapezium flanks.

17. The flat gasket according to claim 16, wherein the plateaus of the trapezoidal elevations and the bases of the trapezoidal depressions are of identical or substantially identical width.

18. The flat gasket according to claim 17, wherein the stopper layer, in the region outside the substantially trapezoidal elevations and depressions, has a thickness Q3, and the width of the plateaus of the trapezoidal elevations and the width of the bases of the trapezoidal depressions is between 30% and 200% of the thickness Q3.

19. The flat gasket according to claim 18, wherein the stopper layer, in the region outside the substantially trapezoidal elevations and depressions, has a thickness Q3, and the width of the plateaus of the trapezoidal elevations and the width of the bases of the trapezoidal depressions is between 40% and 150% of the thickness Q3.

20. The flat gasket according to claim 19, wherein the stopper layer, in the region outside the substantially trapezoidal elevations and depressions, has a thickness Q3, and the width of the plateaus of the trapezoidal elevations and the width of the bases of the trapezoidal depressions is between 40% and 100% of the thickness Q3.

21. The flat gasket according to claim 20, wherein the cross section Q1 is less than 50% of the cross section Q3.

22. The flat gasket according to claim 21, wherein the cross section Q1 is less than 40% of the cross section Q3.

23. The flat gasket according to claim 22, wherein an effective height Q5 of the stopper is between 0.03 mm and 0.3 mm.

24. The flat gasket according to claim 23, wherein the effective height Q5 of the stopper is between 0.05 and 0.25 mm.

25. The flat gasket according to claim 24, wherein the stopper is arranged on that side of the bead which faces towards the passage opening and/or on that side of the bead which faces away from the passage opening.

26. The flat gasket according to claim 25, wherein the stopper annularly surrounds the passage opening.

27. The flat gasket according to claim 26, wherein the stopper surrounds the combustion chamber opening with a spacing of more than 0.1 mm to the combustion chamber periphery.

28. The flat gasket according to claim 27, wherein the stopper annularly surrounds the bead which annularly encompasses the passage opening.

29. The flat gasket according to claim 28, wherein at least one further stopper is provided in the region remote from the passage opening.

30. The flat gasket according to claim 29, wherein the further stopper is arranged in the region of the outer periphery of the flat gasket and/or at least partially in the region outside a region spanned by passage openings for fastening means.

31. The flat gasket according to claim 30, wherein in order to obtain uniform sealing face pressure, the stopper is of such a topographical design that its height and/or width and/or hardness increases with distance from the passage openings for fastening means.

32. The flat gasket according to claim 31, wherein the increasing hardness of the stopper can be generated by means of an increasing hardening of the material, the arrangement of an increasing number of trapezoidal elevations and depressions, by means of an increasing setting angle of the trapezium flanks or by means of a higher degree of embossing of the elevations.

33. The flat gasket according to claim 32, wherein the stopper layer is produced from a steel with a chrome content of less than 1%.

34. The flat gasket according to claim 33, wherein the stopper layer is produced from a steel with a chrome content less than 0.5%.

35. The flat gasket according to claim 34, wherein said gasket is a cylinder head gasket and said passage opening is a combustion chamber opening.

* * * * *